(12) United States Patent
Abouimrane et al.

(10) Patent No.: US 9,419,282 B2
(45) Date of Patent: Aug. 16, 2016

(54) ORGANIC ACTIVE MATERIALS FOR BATTERIES

(75) Inventors: Ali Abouimrane, Naperville, IL (US); Wei Weng, Woodridge, IL (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 1081 days.

(21) Appl. No.: 13/449,661

(22) Filed: Apr. 18, 2012

(65) Prior Publication Data

US 2013/0189571 A1 Jul. 25, 2013

Related U.S. Application Data

(60) Provisional application No. 61/589,494, filed on Jan. 23, 2012.

(51) Int. Cl.
| | | |
|---|---|---|
| *H01M 8/18* | (2006.01) | |
| *H01M 4/60* | (2006.01) | |
| *H01M 10/054* | (2010.01) | |
| *H01M 10/0568* | (2010.01) | |
| *H01M 4/505* | (2010.01) | |

(52) U.S. Cl.
CPC .............. *H01M 4/60* (2013.01); *H01M 8/188* (2013.01); *H01M 10/054* (2013.01); *H01M 10/0568* (2013.01); *H01M 4/505* (2013.01); *H01M 2300/0025* (2013.01)

(58) Field of Classification Search
CPC .................................................... H01M 10/054
See application file for complete search history.

(56) References Cited

U.S. PATENT DOCUMENTS

| | | | | |
|---|---|---|---|---|
| 3,684,668 A | * | 8/1972 | Nohe et al. ................. | C25B 3/04 205/341 |
| 4,728,588 A | * | 3/1988 | Noding ............... | H01M 10/052 429/127 |
| 5,519,567 A | * | 5/1996 | Dapo ............................ | 361/506 |
| 6,221,531 B1 | | 4/2001 | Vaughey et al. | |
| 6,528,208 B1 | | 3/2003 | Thackeray et al. | |
| 7,390,594 B2 | | 6/2008 | Belharouak et al. | |
| 7,919,207 B2 | | 4/2011 | Belharouak et al. | |
| 8,084,009 B2 | * | 12/2011 | Li ............................ | B22F 9/30 423/415.1 |
| 2003/0148188 A1 | | 8/2003 | Umemoto | |
| 2007/0042267 A1 | * | 2/2007 | Kim et al. ...................... | 429/200 |
| 2010/0124707 A1 | | 5/2010 | Hirose et al. | |
| 2010/0237298 A1 | | 9/2010 | Armand et al. | |
| 2011/0104551 A1 | | 5/2011 | Yang et al. | |
| 2011/0151330 A1 | | 6/2011 | Belharouak et al. | |
| 2012/0080648 A1 | | 4/2012 | Abouimrane et al. | |
| 2012/0164499 A1 | * | 6/2012 | Chiang ................. | H01M 8/188 429/81 |
| 2012/0171574 A1 | * | 7/2012 | Zhamu et al. .................. | 429/300 |
| 2013/0298386 A1 | * | 11/2013 | Tarascon et al. ............. | 29/623.1 |

FOREIGN PATENT DOCUMENTS

| | | | | |
|---|---|---|---|---|
| CN | 102110851 | A | * | 6/2011 |
| JP | 2002367673 | A | * | 12/2002 |
| JP | 2008204766 | A | * | 9/2008 |
| SU | 443114 | A | * | 5/1975 |
| WO | WO 02075829 | A1 | * | 9/2002 |
| WO | WO 2011157958 | A1 | * | 12/2011 |

OTHER PUBLICATIONS

Derwent Abstract of SU 443114A, 1975.*
ProQuest machine translation of JP 2002367673, Jul. 2015.*
ProQuest machine translation of CN 102110851 A, Nov. 2015.*
U.S. Appl. No. 13/524,096, filed Jun. 15, 2012, Abouimrane et al.
Armand et al., "Conjugated dicarboxylate anodes for Li-ion batteries", Nature Materials, vol. 8, Feb. 2009, pp. 120-125.
Cao, et al., "Reversible Sodium Ion Insertion in Single Crystalline Manganese Oxide Nanowires with Long Cycle Life", Advanced Materials, 23, 2011, pp. 3155-3160.
Han et al., "Aromatic Carbonyl Derivative Polymers as High-Performance Li-Ion Storage Materials", Advanced Materials, 19, 2007, pp. 1616-1621.
Li et al., "Electrochemical Properties of an All-Organic Redox Flow Battery Using 2,2,6,6-Tetramethyl-1-Piperidinyloxy and N-Methylphthalimide", Electrochemical and Solid-State Letters, 14, (12), pp. A171-A173, (2011).
Lu et al., "In Situ X-Ray Diffraction Study of P2-$Na_{2/3}[Ni_{1/3}Mn_{2/3}]O_2$", Journal of the Electrochemical Society, 148, (11), pp. A1225-A1229, (2001).

* cited by examiner

*Primary Examiner* — Nicole M Buie-Hatcher
(74) *Attorney, Agent, or Firm* — Foley & Lardner LLP

(57) ABSTRACT

A rechargeable battery includes a compound having at least two active sites, $R^1$ and $R^2$; wherein the at least two active sites are interconnected by one or more conjugated moieties; each active site is coordinated to one or more metal ions $M^{a+}$ or each active site is configured to coordinate to one or more metal ions; and "a" is 1, 2, or 3.

6 Claims, 12 Drawing Sheets

ORGANIC ACTIVE MATERIALS FOR BATTERIES

CROSS-REFERENCE TO RELATED APPLICATIONS

This application claims the benefit of U.S. Provisional Patent Application Nos. 61/589,494, filed on Jan. 23, 2012, the entire disclosure of which is incorporated herein by reference for any and all purposes.

GOVERNMENT RIGHTS

This invention was made with Government support under Contract No. DE-AC02-06CH11357 awarded by the Department of Energy. The Government has certain rights in this invention.

FIELD

The present technology is generally related to material for application in sodium batteries, flow batteries and lithium batteries.

BACKGROUND

The development of rechargeable batteries as energy storage devices is a key issue for many future applications. Lithium is typically used in re-chargeable batteries, but its abundance and geographical distribution are a matter of debate. Due to lithium resources and cost, the use of sodium is attractive for use in rechargeable systems. A few cathode materials have been investigated for use in sodium batteries [see Lu, Z et al. *Electrochemical Society,* 148; A1225-A1229 (2001); and Cao, Y. L et al. *Adv. Mater.* 23; 3155-31581, (2011). However, the main obstacle facing such systems is the anode composition.

In addition, environmental effects and sustainability, demand that low-polluting, organic materials be considered for use, without the presence of heavy metals. For example X. Han et al. [see *Adv. Mater.* 19, 1616-1621 (2007)] shows that aromatic carbonyl derivative polymers such as 3,4,9,10-perylenetetracarboxylicacid-dianhydride (PTCDA) can insert lithium near 2.5V. This material has been proposed as cathode material for lithium batteries. Conjugated dicarboxylate based materials such as di-lithium trans-trans-muconate and di-lithium terephthalate (abbreviated thereafter as $Li_2BDC$) were also studied as organic anode material for lithium batteries [see Armand et al. *Nature Materials* 8; 120-125 (2009)]. U.S. Patent Publ. No. 2010/0237298 proposes the use of quinone based materials for lithium battery applications. U.S. Patent Publ. No. 2003/0148188 describes the use of tetraketopiperazine based materials as positive cathodes for lithium batteries applications.

Flow batteries are rechargeable systems where at least one electrode (anode or/and cathode) is soluble in a solvent. For example, a soluble anode can insert any kind of cations. An example of this flow battery system is published by Li et al. (*Electrochemial and Solid State Letters* 14(12); A171-A173 (2011)). Li describes the use of 2,2,6,6-tetramethyl-1-piperidinyloxy and N-methylphthalimide as an all-organic redox flow battery. Unfortunately, the battery voltage is only 1.4V due principally to the high voltage insertion of the anode N-Methylphthalimide, which is close to 1.7V vs lithium.

SUMMARY

In one aspect, an active material for use in a battery is provided, the active material including a compound represented as $R^1$—Y—$R^2$; where $R^1$ and $R^2$ represent at least two active sites which are carboxylic acid groups, anhydride groups, groups configured to coordinate to a metal ion, or groups coordinated to a metal ion; Y is a conjugated moiety joining $R^1$ and $R^2$; and the battery is a flow battery or a sodium battery. In such an anpect, Y may include one or more of an alkenyl, alkynyl, or aryl group. In one embodiment, the battery is a sodium battery. In such an embodiment, the compound is included in an anode of the battery. In another embodiment, the battery is a flow battery. In such an embodiment, the compound is included as a soluble or suspended anode of the battery, or alternatively, the compound is included as a soluble or suspended cathode of the battery.

In any of the above embodiments, the compound may be represented as a compound of Formula I, II, III, or IV:

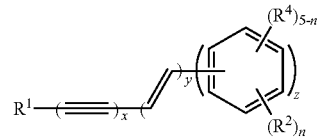

Formula I

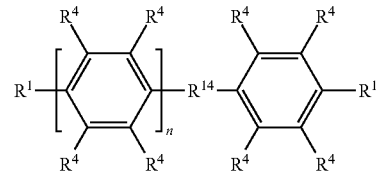

Formula II

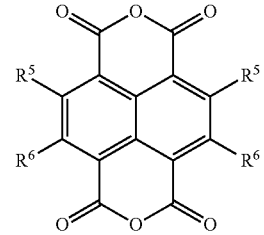

Formula III

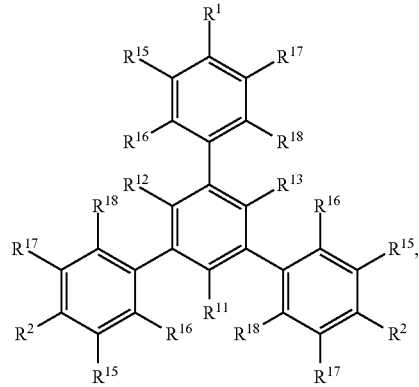

Formula IV where $R^1$ and $R^2$ are individually C(O)OM, C(O)O$R^3$, $SO_3H$, $SO_3M$, COH, COR$^3$, $NO_2$, or CR$^7$(=NCHR$^8$R$^9$); $R^3$ is H, alkyl, or aryl; $R^7$ is H or alkyl; $R^8$ is H or alkyl; $R^9$ is H or alkyl; M is Li, Na, K, or Mg; $R^{14}$ is C(O), C(O)OCH$_2$CH$_2$, C(O)OCH$_2$CH$_2$CH$_2$, (C(O)OCH$_2$CH$_2$CH$_2$CH$_2$, C(O)CH$_2$CH$_2$OCH$_2$, C(O)CH$_2$CH$_2$OCH$_2$CH$_2$, or S(O)(O); x, y, and z are individually 0, 1, 2, 3, 4, 5, or 6, with the proviso that at least one of x, y, and z is greater than 0; n is 1 or 2; each $R^4$ is individually H, F, Cl, Br, I, OH, CN, $NO_2$, alkyl, alkoxy, or aryl, or any two adjacent $R^4$ groups may join together to form a fused ring; and $R^5$, $R^6$, $R^{11}$, $R^{12}$, $R^{13}$, $R^{15}$, $R^{16}$, $R^{17}$, and $R^{18}$ are individually H, F, Cl, Br, I, OH, CN, $NO_2$, alkyl, alkoxy, or aryl, or any two adjacent $R^5$, $R^6$, $R^{11}$, $R^{12}$, $R^{13}$ $R^{15}$, $R^{16}$, $R^{17}$ and $R^{18}$ may join together to form a fused ring. In one embodiment, $R^5$, $R^6$, $R^{11}$, $R^{12}$, $R^{13}$ $R^{15}$, $R^{16}$, $R^{17}$, and $R^{18}$ are individually H, methyl, ethyl, propyl, isopropyl, fluoro, chloro, bromo, methoxy, ethoxy, 2-methoxyethoxy, or 2,2,2-trifluoromethoxy. In any of the above embodiments, x may be 0 or 1; y may be 0 or 1; and z may be 1, 2, or 3. In any of the above embodiments, $R^1$ and $R^2$ may be C(O)OM or C(O)OR$^3$, and $R^3$ is H, or $C_1$-$C_{10}$ alkyl. In any of the above embodiments, each $R^4$ may be individually H, F, Cl, Br, OH, or $C_1$-$C_4$ alkyl. In any of the above embodiments, $R^1$ and $R^2$ may be individually C(O)OH, C(O)OLi, C(O)ONa, C(O)OK, C(O)OMg, C(O)OCH$_3$, C(O)OCH$_2$CH$_3$, C(O)OCH$_2$CH$_2$CH$_3$, C(O)OCH(CH$_3$)$_2$, C(O)O(CH$_2$)$_3$CH$_3$, C(O)OCH$_2$CH(CH$_3$)$_2$, C(O)OCH$_2$CH$_2$OCH$_3$, C(O)OCH$_2$CH$_2$OCH$_2$CH$_2$OCH$_3$, SO$_3$Li, SO$_3$Na, SO$_3$K, SO$_3$Mg, SO$_3$H, COH, COCH$_3$, COCH$_2$CH$_3$, C(O)O(Phenyl), C(O)O(benzyl), NO$_2$, CMe(=NCH(Me)$_2$), and C(Phenyl)(=NCH(CH$_3$)$_2$).

In any of the above embodiments, the compound is represented by any one or more of Formulas IA, IB, and ID:

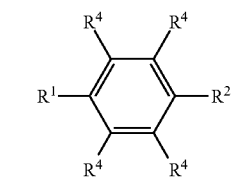

Formula IA

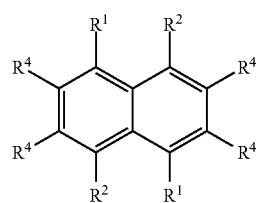

Formula IB

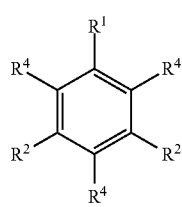

Formula ID where $R^1$ and $R^2$ are C(O)OH, C(O)OM, or C(O)OR$^3$, and each $R^4$ is H. In some embodiments, each $R^3$ is individually H or $C_1$-$C_6$alkyl.

In another embodiment, the active material includes a compound of Formula III and $R^5$ and $R^6$ are H. In another embodiment, the active material includes a compound of Formula IV, and $R^1$ and $R^2$ are C(O)OH, C(O)OM, or C(O)OR$^3$; and $R^{11}$, $R^{12}$, $R^{13}$, $R^{15}$, $R^{16}$, $R^{17}$, and $R^{18}$ are H.

In another embodiment, the active material includes a compound as represented by one or more of:

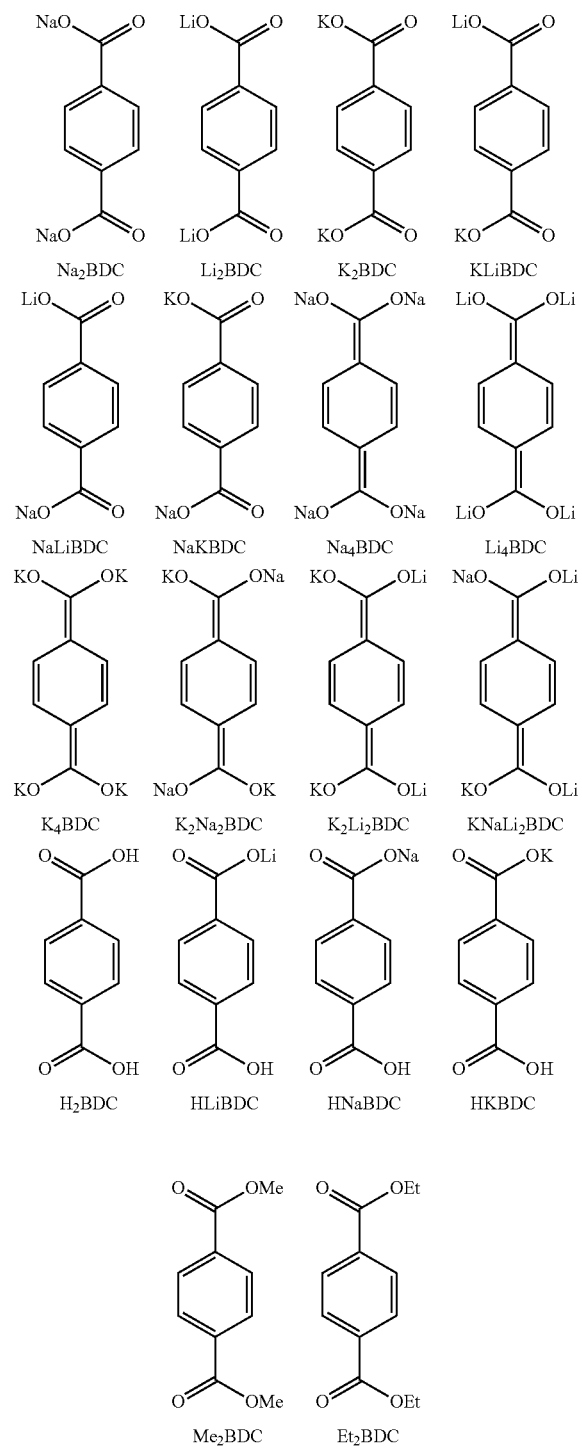

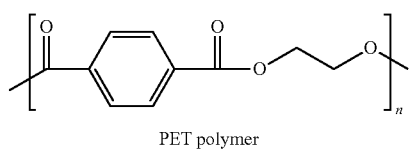

PET polymer

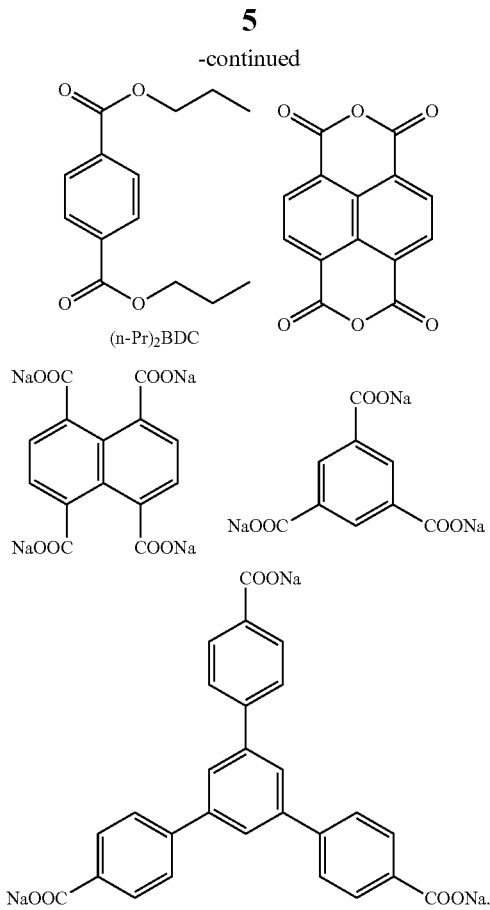
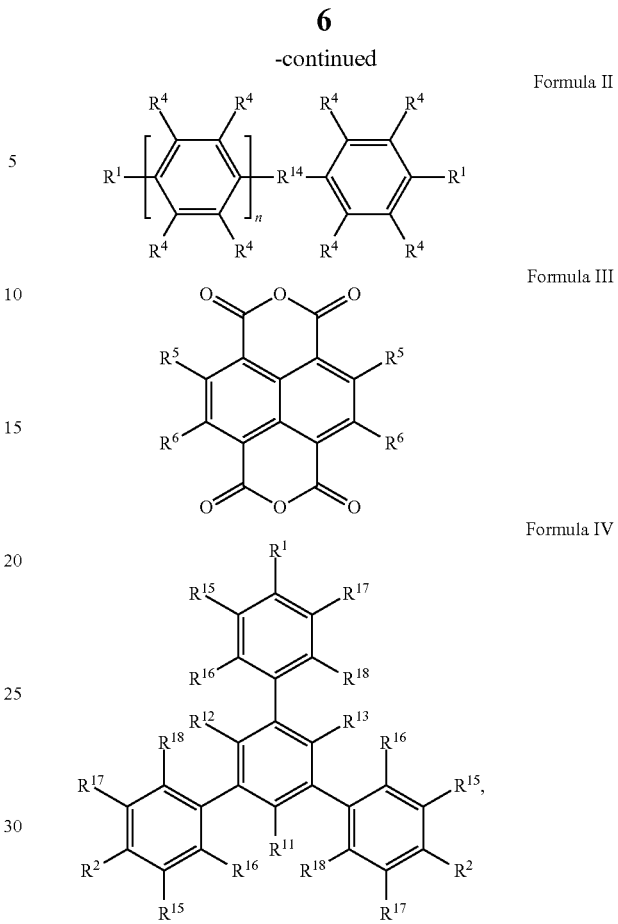

In another embodiment, the battery includes an anode, and the anode includes the compound, where the compound includes monosodium terephthalate (HNaBDC), disodium terephthalate ($Na_2BDC$), monolithium terephthalate (HLiBDC), dilithium terephthalate ($Li_2BDC$), monopotassium terephthalate (HKBDC), dipotassium terephthalate ($K_2BDC$), monosodium monolithium terephthalate (NaLiBDC), monosodium monopotassiu terephthalate (NaKBDC), or monolithium monopotassium terephthalate (LiKBDC). In one embodiment, the compound includes polyethylene terephthalate or terephthalic acid.

In another aspect, an electrolyte is provided including any of the above compounds. As such, the compounds may be referred to as electrolyte additives. For example, the electrolyte may include a solvent and a compound represented as $R^1$—Y—$R^2$, wherein $R^1$ and $R^2$ represent at least two active sites which are carboxylic acid groups, anhydride groups, groups configured to coordinate to a metal ion, or groups coordinated to a metal ion; and Y is a conjugated moiety joining $R^1$ and $R^2$. In some embodiments, the compound is represented by Formula I, II, III, or IV:

where $R^1$ and $R^2$ are individually C(O)OM, $C(O)OR^3$, $SO_3H$, $SO_3M$, COH, $COR^3$, $NO_2$, or $CR^7(=NCHR^8R^9)$; $R^3$ is H, alkyl, or aryl; $R^7$ is H or alkyl; $R^8$ is H or alkyl; $R^9$ is H or alkyl; M is Li, Na, K, or Mg; $R^{14}$ is C(O), $C(O)OCH_2CH_2$, $C(O)OCH_2CH_2CH_2$, $(C(O)OCH_2CH_2CH_2CH_2$, $C(O)CH_2CH_2OCH_2$, $C(O)CH_2CH_2OCH_2CH_2$, or S(O)(O); x, y, and z are individually 0, 1, 2, 3, 4, 5, or 6, with the proviso that at least one of x, y, and z is greater than 0; n is 1 or 2; each $R^4$ is individually H, F, Cl, Br, I, OH, CN, $NO_2$, alkyl, alkoxy, or aryl, or any two adjacent $R^4$ groups may join together to form a fused ring; and $R^5$, $R^6$, $R^{11}$, $R^{12}$, $R^{13}$, $R^{15}$, $R^{16}$, $R^{17}$, and $R^{18}$ are individually H, F, Cl, Br, I, OH, CN, $NO_2$, alkyl, alkoxy, or aryl, or any two adjacent $R^5$, $R^6$, $R^{11}$, $R^{12}$, $R^{13}$ $R^{15}$, $R^{16}$, $R^{17}$ and $R^{18}$ may join together to form a fused ring. In one embodiment, $R^5$, $R^6$, $R^{11}$, $R^{12}$, $R^{13}$ $R^{15}$, $R^{16}$, $R^{17}$, and $R^{18}$ are individually H, methyl, ethyl, propyl, isopropyl, fluoro, chloro, bromo, methoxy, ethoxy, 2-methoxyethoxy, or 2,2,2-trifluoromethoxy. In any of the above embodiments, x may be 0 or 1; y may be 0 or 1; and z may be 1, 2, or 3. In any of the above embodiments, $R^1$ and $R^2$ may be C(O)OM or $C(O)OR^3$, and $R^3$ is H, or $C_1$-$C_{10}$ alkyl. In any of the above embodiments, each $R^4$ may be individually H, F, Cl, Br, OH, or $C_1$-$C_4$ alkyl. In any of the above embodiments, $R^1$ and $R^2$ may be individually C(O)OH, C(O)OLi, C(O)ONa, C(O)OK, C(O)OMg, $C(O)OCH_3$, $C(O)OCH_2CH_3$, $C(O)OCH_2CH_2CH_3$, $C(O)OCH(CH_3)_2$, $C(O)O(CH_2)_3CH_3$, $C(O)OCH_2CH(CH_3)_2$, $C(O)OCH_2CH_2OCH_3$, $C(O)OCH_2CH_2OCH_2CH_2OCH_3$, $SO_3Li$, $SO_3Na$, $SO_3K$, $SO_3Mg$, $SO_3H$, COH, $COCH_3$, $COCH_2CH_3$, C(O)O(Phenyl), C(O)O(benzyl), $NO_2$, $CMe(=NCH(Me)_2)$, and $C(Phenyl)(=NCH(CH_3)_2$.

In one embodiment, the compound is represented by Formula IAH, IBH, ICH, IDH, III, or IVH:

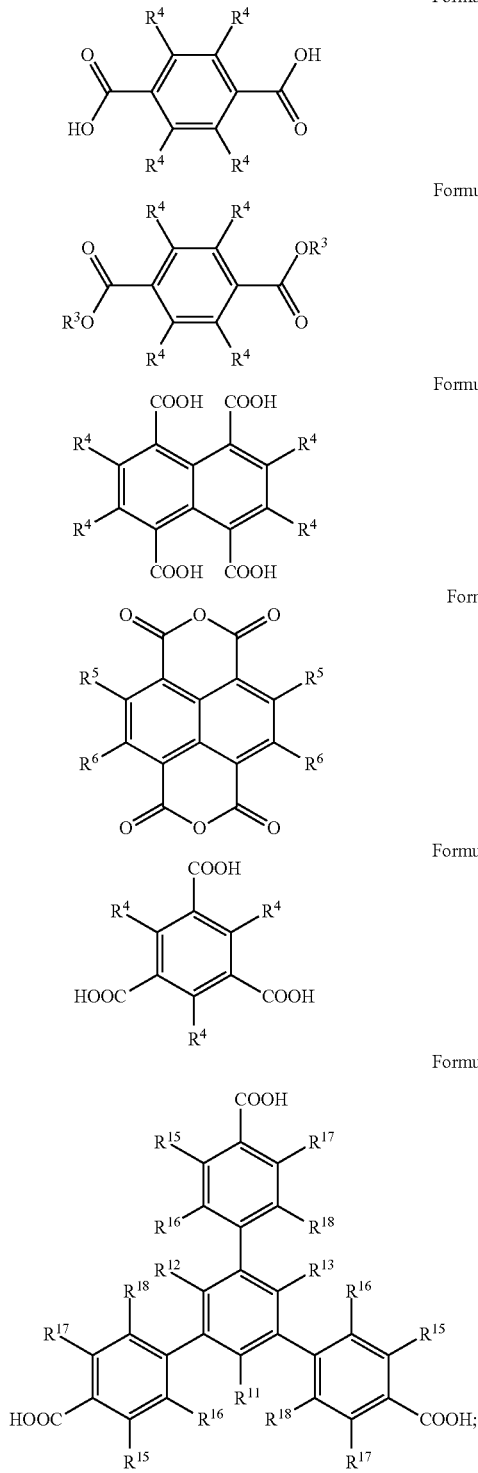

where each $R^3$ is individually H or alkyl; and $R^4$, $R^5$, $R^6$, $R^{11}$, $R^{12}$, $R^{13}$, $R^{15}$, $R^{16}$, $R^{17}$ and $R^{18}$ are each individually H, alkyl, halo, alkoxy, cyano, or nitro, or where any two adjacent $R^4$, $R^5$, $R^6$, $R^{11}$, $R^{12}$, $R^{13}$, $R^{15}$, $R^{16}$, $R^{17}$ and $R^{18}$ may join together to form a fused ring.

In some embodiments, materials are provided for use a solid anode active material in sodium batteries, as an active solute in a flow battery, or as active additive in lithium ion or sodium ion batteries. For materials not soluble in electrolyte solvents (aqueous or non-aqueous) the materials may insert sodium ion reversibly with tunable voltage range due to a large selection of functional groups. This voltage is between 0 and 4.5 V versus Na metal. For materials which may be dissolved in electrolyte solvent, the material may be used as negative electrolyte ((for voltage between 0 V and 2.5V) and as a positive electrolyte (for voltage between 1.5 V and 4.5V). Electrolyte solvents for cathode and anode can be identical or different. The positive electrolytes and negative electrolytes are separated by a membrane that only allows the pass of common cations (for example, Li+, Na+, Mg, Zn, Al). The negative electrolyte can insert cations such as Li, Na, K, Mg, Al and Zn to keep the charge balanced after redox reaction. Furthermore if the compounds are soluble in a carbonate electrolyte they can be used in lithium or sodium batteries as an over discharge redox shuttle, or for cell balancing.

DETAILED DESCRIPTION

Figure 1:
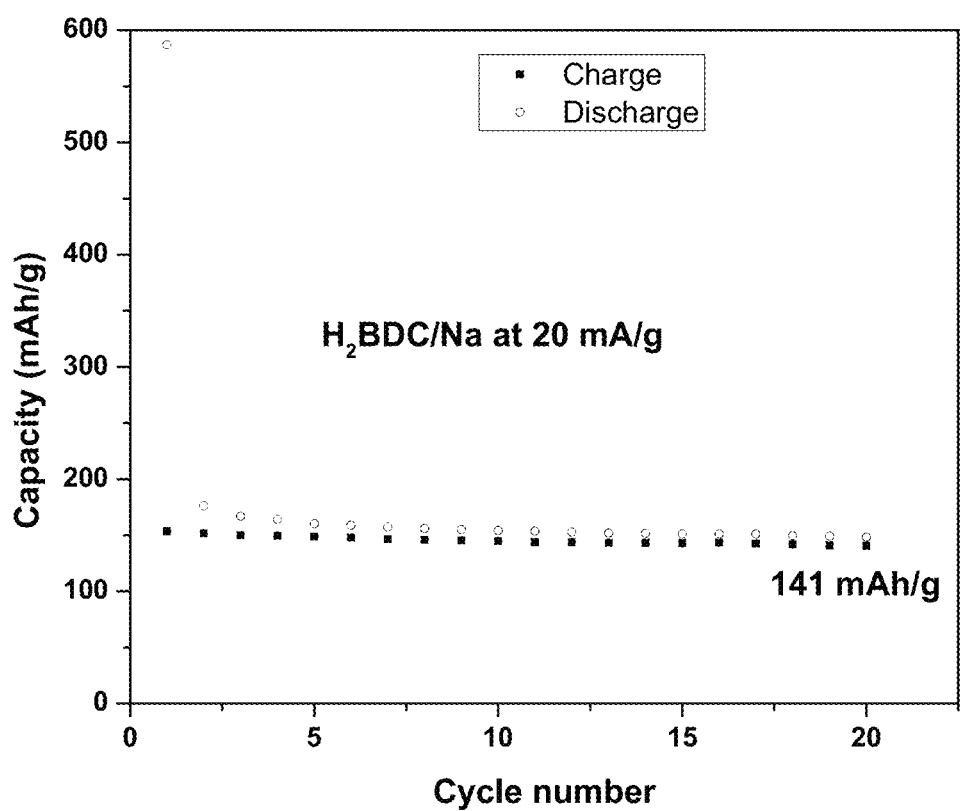
FIG. 1 is a graph illustrating the capacity versus the cycle of Na/$H_2$BDC half-cell, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, $CH-CH=CH_2$, $C=CH_2$, or $C=CHCH_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Batteries and electrolytes are provided, which include a compound represented as $R^1$—Y—$R^2$, where $R^1$ and $R^2$ represent at least two active sites which are carboxylic acid groups, anhydride groups, groups configured to coordinate to a metal ion, or groups coordinated to a metal ion; Y is a conjugated moiety joining $R^1$ and $R^2$; and the battery is a flow battery or a sodium battery. Alternatively, the compound may be used in a battery where the compound is soluble in the solvent, in such case the compound may be present in the solvent as a low concentration additive to protect against over discharging, or for cell balancing. As used herein, cell balancing refers to providing for similar charge and discharge capacities throughout the cells of a battery. Where the battery is a flow battery, and the compound is soluble or suspended in the electrolyte, the compound may be dissolved or suspended into the electrolyte. As used herein, a flow battery is defined as a rechargeable system wherein an electrolyte, containing one or more dissolved or suspended, electroactive species, flows through an electrochemical cell where the electroactive species are reversibly converted from chemical energy directly into electricity. The systems may include reservoirs where the electroactive species are stored until they are pumped through the system.

The batteries may be useful in a wide variety of applications including, but not limited to, hybrid electric vehicles, electric vehicles, smart grid application, and consumer electronics. Due to considerations of environmental effects and sustainability, low-polluting materials are becoming more desirable and organic materials that do not include any heavy metals have recently attracted significant attention as alternative, active materials for rechargeable batteries. By using organic-based materials, such as the compounds of formula $R^1$—Y—$R^2$, it is expected that the processes will consume less energy during the preparation (i.e. due to the low temperatures employed) which will result in a smaller carbon footprint. A battery industry incorporating a significant percentage of renewable organic materials is more secure, because the feedstock can be regenerated in a rather short period of time, unlike petroleum.

The selection of the particular compound for inclusion in a battery or electrolyte is based on the electrochemical properties of the compound, its solubility and the characteristics of the materials relating to the other battery components and their relative reactivities. For example, the compounds may be soluble in the electrolyte, or the compounds may not be soluble in the electrolyte. This will determine whether the compound is used in an anode or in a flow battery. The compound will also have an impact on overall battery potential and cycling ability. As an illustration, the neutral compounds, such as the acids or esters, are generally soluble in the solvents described herein, whereas the salt compounds of the acids generally are not soluble. For example, if the compound is not soluble an electrolyte solvent that is utilized in the battery, the compound can be used as active electrode for rechargeable sodium batteries. In one embodiment, when the compound is used in rechargeable sodium batteries it can be used as anode if its voltage <than 2.5 V vs $Na^+/Na^0$ or as cathode if it voltage >than 2V vs $Na^+/Na^0$. If the compound is soluble in the solvent of the electrolyte, the compound may be used either as an additive to the electrolyte of the rechargeable battery, or as a soluble active material in a flow battery.

In one aspect, a battery is provided, the battery including a compound represented as $R^1$—Y—$R^2$, where $R^1$ and $R^2$ represent at least two active sites which are carboxylic acid groups, anhydride groups, groups configured to coordinate to a metal ion, or groups coordinated to a metal ion; Y is a conjugated moiety joining $R^1$ and $R^2$; and the battery is a flow battery or a sodium battery. In some embodiments, the active sites are be coordinated to one or more metal ions, $M^{a+}$, or each of the active sites may be configured to coordinate to one or more metal ions, $M^{a+}$. In the compounds, the one or more metal ions, to which the compound may be coordinated, may be monovalent ("a" is 1), divalent ("a" is 2), trivalent ("a" is 3). This includes, but is not limited to metal ions such as $Li^+$, $Na^+$, $Mg^{2+}$, $Zn^{2+}$, or $Al^{3+}$. The one or more conjugated moieties are interconnected such that there is electronic communication from one active site to the other. Accordingly, a conjugated Y moiety may be one or more of alkenyl, alkynyl, aryl, or heteroaryl groups, or resonance forms thereof. The rechargeable battery may be in a charged state or a discharged stated. For example in one embodiment, the rechargeable battery is in a charged state. In another embodiment, the battery is in a discharged state. The discharge state may be achieved via chemical lithiation, electrochemical lithiation, chemical sodiation, or electrochemical sodiation.

The batteries may include sodium batteries and flow batteries. Where the battery is a sodium battery, an anode of the sodium battery may include the compound as a solid. Where the battery is flow battery, it may include the compound a soluble or suspended anode or cathode of the flow battery.

To coordinate to the metal ion, the active site will have the ability to chelate the metal ion, e.g. donate a lone pair of electrons to the metal ion. Thus, the active sites, $R^1$ and $R^2$, may include groups such as, but not limited to, C(O), C(O)O⁻, C(O)OH, C(O)OR$^3$, C=N—R$^3$, C=S, N=O, S=O, SO$_2$, SO$_3$, P=O, or Si=O, where each R$^3$ is individually H or alkyl. Where R$^3$ is alkyl, it may be a $C_1$-$C_8$ alkyl. In some embodiments, R$^1$ and R$^2$ include C(O)O⁻ or C(O)OH.

Illustrative compounds for use in the batteries, include, but are not limited to, those of Formula I, II, III, or IV:

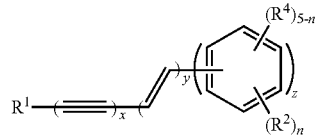

Formula I

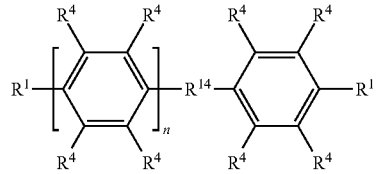

Formula II

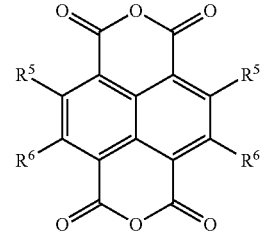

Formula III

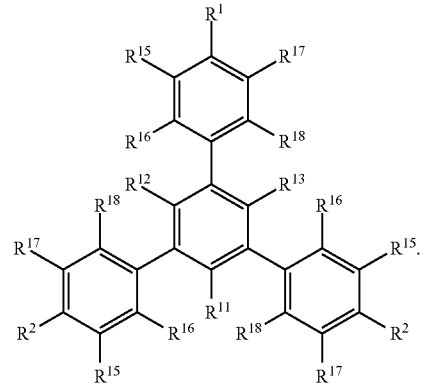

Formula IV

In Formulas I, II, III and IV, $R^1$ and $R^2$ are individually C(O)OM, C(O)OR$^3$, SO$_3$H, SO$_3$M, COH, COR$^3$, NO$_2$, or CR$^7$(=NCHR$^8$R$^9$), where R$^3$ is H, alkyl, or aryl; R$^7$ is H or alkyl; R$^8$ is H or alkyl; R$^9$ is H or alkyl; M is Li, Na, K, or Mg; x, y, and z are individually 0, 1, 2, 3, 4, 5, or 6, at least one of x, y, and z is greater than 0, and the x, y, and z groups may be in any order in the compound; n is 1 or 2; R$^{14}$ is C(O), C(O)OCH$_2$CH$_2$, C(O)OCH$_2$CH$_2$CH$_2$, (C(O) OCH$_2$CH$_2$CH$_2$CH$_2$, C(O)CH$_2$CH$_2$OCH$_2$, C(O) CH$_2$CH$_2$OCH$_2$CH$_2$, or S(O)(O); each R$^4$ is individually H, F, Cl, Br, I, OH, CN, NO$_2$, alkyl, alkoxy, or aryl, or any two adjacent R$^4$ groups may join together to form a fused ring; and R$^5$, R$^6$, R$^{11}$, R$^{12}$, R$^{13}$ R$^{15}$, R$^{16}$, R$^{17}$, and R$^{18}$ are individually H, F, Cl, Br, I, OH, CN, NO$_2$, alkyl, alkoxy, or aryl, or any two adjacent R$^5$, R$^6$, R$^{11}$, R$^{12}$, R$^{13}$ R$^{15}$, R$^{16}$, R$^{17}$, and R$^{18}$ may join together to form a fused ring. For example, where two R$^4$ groups join together in Formula I, a naphthalenyl or tetrahydronaphthalenyl group may be formed with the existing aryl group, or a larger ring system may be formed.

In some embodiments of Formulas III and IV, R$^5$, R$^6$, R$^{11}$, R$^{12}$, R$^{13}$ R$^{15}$, R$^{16}$, R$^{17}$, and R$^{18}$ are individually H, methyl, ethyl, propyl, isopropyl, fluoro, chloro, bromo, methoxy, ethoxy, 2-methoxyethoxy, or 2,2,2-trifluoromethoxy. In any of the above embodiments, x may be 0 or 1, y may be 0 or 1, and z may be 1, 2, or 3. In any of the above embodiments, m and n are 1. In any of the above embodiments of Formulas I, II, III and IV, $R^1$ and $R^2$ may be C(O)OM or C(O)OR$^3$, and $R^3$ is H, or $C_1$-$C_{10}$ alkyl. In any of the above embodiments of Formulas I, II, III and IV, each $R^4$ is individually H, F, Cl, Br, OH, or $C_1$-$C_4$ alkyl. In any of the above embodiments, $R^1$ and $R^2$ are individually C(O)OH, C(O)OLi, C(O)ONa, C(O)OK, C(O)OMg, C(O)OCH$_3$, C(O)OCH$_2$CH$_3$, C(O)OCH$_2$CH$_2$CH$_3$, C(O)OCH(CH$_3$)$_2$, C(O)O(CH$_2$)$_3$CH$_3$, C(O)OCH$_2$CH(CH$_3$)$_2$, C(O)OCH$_2$CH$_2$OCH$_3$, C(O)OCH$_2$CH$_2$OCH$_2$CH$_2$OCH$_3$, SO$_3$Li, SO$_3$Na, SO$_3$K, SO$_3$Mg, SO$_3$H, COH, COCH$_3$, COCH$_2$CH$_3$, C(O)O(Phenyl), C(O)O(benzyl), NO$_2$, CMe(=NCH(Me)$_2$), and C(Phenyl)(=NCH(CH$_3$)$_2$).

Illustrative of the compounds represented by Formula I includes any one or more of the compounds represented by Formula IA, IB, and ID:

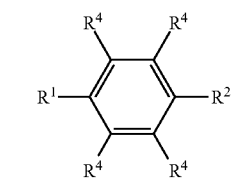

Formula IA

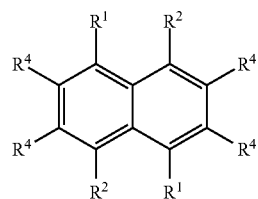

Formula IB

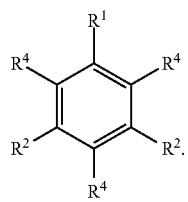

Formula ID

In some embodiments, $R^1$ and $R^2$ are C(O)OH, C(O)OM, or C(O)OR$^3$, and each $R^4$ is H. In some embodiments, each $R^3$ is individually H or $C_1$-$C_6$alkyl. An illustrative compound of Formula III is where $R^5$ and $R^6$ are H. An illustrative compound of Formula IV is where $R^1$ and and $R^2$, are C(O)OH, C(O)OM, or C(O)OR$^3$; and $R^{11}$, $R^{12}$, $R^{13}$, $R^{15}$, $R^{16}$, $R^{17}$, and $R^{18}$ and H.

Illustrative compounds of Formula I and IV include, but are not limited to:

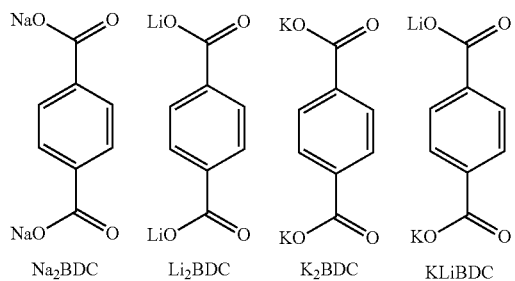

Na$_2$BDC    Li$_2$BDC    K$_2$BDC    KLiBDC

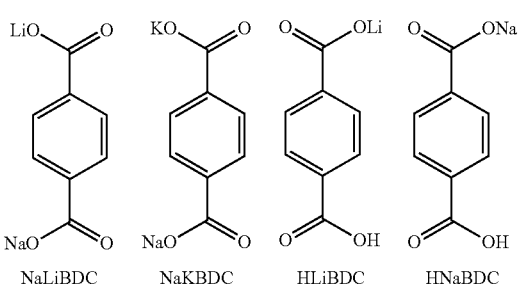

NaLiBDC    NaKBDC    HLiBDC    HNaBDC

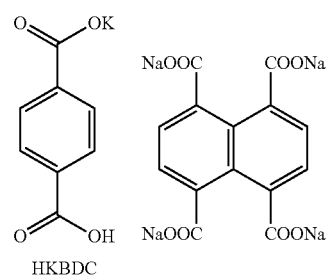

HKBDC

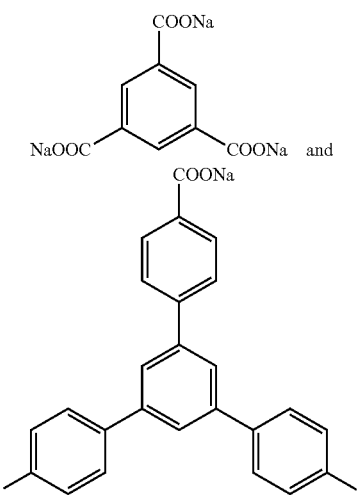

In one embodiment, the compound includes HNaBDC, Na$_2$BDC, HLiBDC, Li$_2$BDC, K$_2$BDC, HKBDC, NaLiBDC, or NaKBDC.

Other illustrative compounds of Formula I, II, III and IV include, but are not limited to,

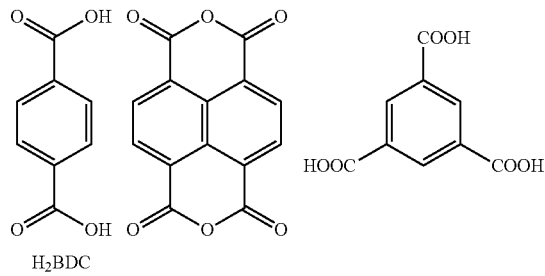

H₂BDC

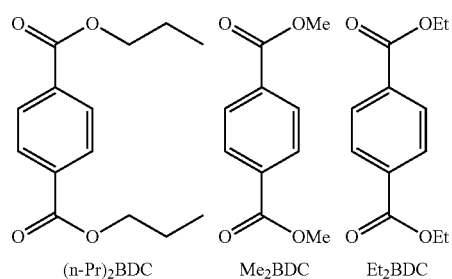

(n-Pr)₂BDC      Me₂BDC      Et₂BDC

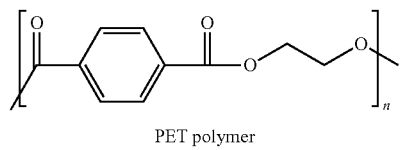

PET polymer

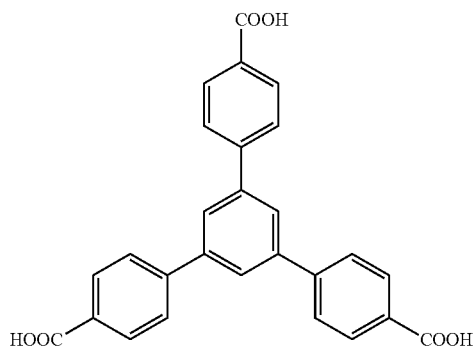

In one embodiment, the compound is terephthalic acid. In another embodiment, the compound is polyethylene terephthalate. It should be noted that any one of the above described compounds, whether a neutral acid or ester, or a metal chelated compound may be used, as well as combinations of any two or more such compounds.

The compounds also include those above which are in an oxidized, or discharged state. Such compounds may then coordinate more than one metal at each active site, with the compound taking on a resonance structure appearance. For example, such compound may include, but are not limited to:

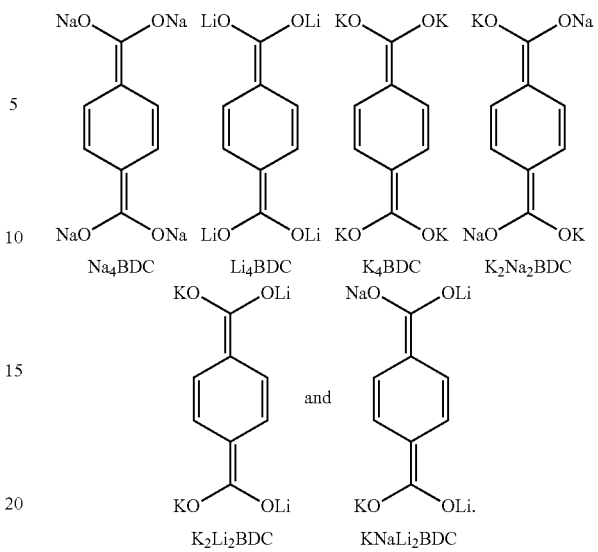

Na₄BDC      Li₄BDC      K₄BDC      K₂Na₂BDC

K₂Li₂BDC      KNaLi₂BDC

As noted above, the compounds are used in batteries of three types for a particular purpose. For example, in a sodium battery, the compounds may form at least a portion of the anode, being sequestered to the anode using a binder, or the compounds may be included at a low concentration in the electrolyte of the sodium battery, where the compound is soluble in the electrolyte. In a flow battery, the compounds may be soluble or suspened in the electrolye of the flow battery for use as an anodic active material. In lithium or sodium ion batteries, the compounds may be included at a low concentration in the electrolyte of the lithium or sodium battery, where the compound is soluble in the electrolyte.

In one aspect of the sodium batteries, at least one cathode and at least one anode are present. In one embodiment, the compounds described above are sequestered on the anode, being either adhered to the anode in a carbon matrix, in a polymer matrix, or with a binder by making a laminate on a current collector. Illustrave current collectors include conductive metals. For example, suitable metals include, but are not limited to, those such as Al, Cu, Ni, and carbon coated Al. In various embodiments, the anode may include any of the above compounds. In some embodiments, the anode may include compounds such as, but not limited to, terephthalic acid (H₂BDC), monosodium terephthalate (HNaBDC), disodium terephthalate (Na₂BDC), monolithium terephthalate (HLiBDC), dilithium terephthalate (Li₂BDC), monopotassium terephthalate (HKBDC), dipotassium terephthalate (K₂BDC), monosodium monolithium terephthalate (NaLiBDC), monosodium monopotassiu terephthalate (NaKBDC), or monolithium monopotassium terephthalate (LiKBDC).

Where the compound is adhered to the anode of a battery, the compound may be present with a binder on the current carrier. In such an anode, the compound may be mixed with the binder at a wt % of from about 0.1 wt % to about 99 wt %. In some embodiments, the amount of the compound in the binder is from about 70 wt % to about 90 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-cofluorenone-co-methylbenzoic ester), a copolymer of any two or more such polymers, or a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), or a copolymer of any two or more such conductive polymers.

The current collector provides contact between the electroactive material and an external load to allow for the flow of electrons through a circuit to which the electrode is connected. The current collector may be a conductive material. Illustrative current collectors include, but are not limited to, aluminum, nickel, platinum, palladium, gold, silver, copper, iron, stainless steel, rhodium, manganese, vanadium, titanium, tungsten, or aluminum carbon coated or any carbon-coated metal described above.

The compounds may also be combined with other active materials in the anode. For example, such other active material may include, but are not limited to, porous active carbon materials which may include any such carbon material that is known for use in batteries. The material may include a high surface area carbon material and/or nanoparticulate carbon materials. For example, the high surface area carbon materials include, but are not limited to, microporous carbon, mesoporous carbon, mesoporous microbeads, graphite, expandable graphite, carbon black, carbon nanotubes, carbon nanofibers, graphene, crystalline graphite, amorphous graphite, hard carbon, soft carbon coal, and acetylene black. Commercial examples of carbon black include, but are not limited to, Super P, Black Pearl 2000, Denka Black, Vulcan XC72R, and Ketjen black.

Where the compound is used for sodium battery applications, the battery includes a sodium electrolyte having a solvent and a salt. Suitable solvents include, but are not limited to, carbonates, sulfones, formamides, lactones, nitriles, ionic liquids, and ethers. Illustrative solvents include, but are not limited to ethylene carbonate, propylene carbonate, dimethylformamide, dimethylacetamide, gamma-butyrolactone, gamma-valerolactone, delta-valerolactone, pyrrolidinone, 1-methyl-2-pyrrolidinone, ethyl heptanoate, acetonitrile, 1,3-dioxolane, 2-methyluran, 1,3-dimethoxypropane, glycerol carbonate methyl carbonate, dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, dimethoxyethane, triglyme, dimethylvinylene carbonate, tetraethyleneglycol, dimethyl ether, polyethylene glycols, and sulfones.

Suitable salts for use in the electrolytes include, but are not limited to, LiBr, NaBr, LiI, NaI, LiSCN, NaSCN, LiBF$_4$, NaBF$_4$, LiAlF$_4$, NaAlF$_4$, LiPF$_6$, NaPF$_6$, LiAsF$_6$, NaAsF$_6$, LiClO$_4$, NaClO$_4$, Li$_2$SO$_4$, Na$_2$SO$_4$, LiB(Ph)$_4$, NaB(Ph)$_4$, LiAlO$_2$, Li[N(FSO$_2$)$_2$], Na[N(FSO$_2$)$_2$], Li[SO$_3$CH$_3$], Na[SO$_3$CH$_3$], Li[BF$_3$(C$_2$F$_5$)], Na[BF$_3$(C$_2$F$_5$)], Li[PF$_3$(CF$_2$CF$_3$)$_3$], Na[PF$_3$(CF$_2$CF$_3$)$_3$], Li[B(C$_2$O$_4$)$_2$], Na[B(C$_2$O$_4$)$_2$], Li(BC$_2$O$_4$F$_2$), Na(BC$_2$O$_4$F$_2$), Li[PF$_4$(C$_2$O$_4$)], Na[PF$_4$(C$_2$O$_4$)], Li[N(CF$_3$SO$_2$)$_2$], Na[N(CF$_3$SO$_2$)$_2$], Li[C(SO$_2$CF$_3$)$_3$], Na[C(SO$_2$CF$_3$)$_3$], Li[N(C$_2$F$_5$SO$_2$)$_2$], Na[N(C$_2$F$_5$SO$_2$)$_2$], LiCF$_3$SO$_3$, NaCF$_3$SO$_3$, Li$_2$B$_{12}$X$_{12-n}$H$_n$, Na$_2$B$_{12}$X$_{12-n}$H$_n$, Na$_2$B$_{10}$X$_{10-n}$H$_n$, Na$_2$B$_{10}$X$_{10-n'}$H$_{n'}$, Li$_2$S$_{x''}$, Na$_2$S$_{x''}$, (LiS$_{x''}$R)$_y$, (NaS$_{x''}$R)$_y$, or (LiSe$_{x''}$R)$_y$; (NaSe$_{x''}$R)$_y$ where X is a halogen, n is an integer from 0 to 12, n' is an integer from 0 to 10, x" is an integer from 1 to 20, y is an integer from 1 to 3, and R is H, alkyl, alkenyl, aryl, ether, F, CF$_3$, COCF$_3$, SO$_2$CF$_3$, or SO$_2$F.

When the compound is used as an anode for a sodium battery, some anode stabilizing compounds may be added to improve the solid electrolyte interface (SEI) stability, and the cycleability of the battery. Such additives can either reduce or polymerize and form a passivation film on the electrodes. Example of additives are but not limited to Li[B(C$_2$O$_4$)$_2$], Li[BF$_2$(C$_2$O$_4$)], or Li[PF$_2$(C$_2$O$_4$)]$_2$, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methyl pyrrole, naphthalene, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9 diethylidene-1,5,7,11-tetraoxaspiro[5.5]undecane, or a mixture of any two or more thereof.

When the compound is used as anode for sodium batteries application various sodium cathode can be used. Examples of cathode materials are but not limited: NaM$_{1-x}$M'$_x$PO$_4$, Na$_x$M$_y$M'$_z$O$_2$, Na$_2$FePO$_4$F, Na$_2$MnPO$_4$F, NaFeSO$_4$F, NaMnSO$_4$F, NaV$_{1-a}$Cr$_a$PO$_4$F, Na$_2$S, Na$_2$Se (0<x; 0<y+z; M, M' transition elements such as Mn, Ni, Fe, Co, Cu; Cr, Mg and a<1). When the compound is used as anode in the discharged state for sodium batteries application various cathodes can be used. Example of cathode materials are but not limited: Se, S, MnO$_2$, FeF$_3$, MnFe$_3$, V$_2$O$_5$ and Se$_x$S$_y$ (0<x+y).

The compound for use as an electrode solute or suspending in a solvent for a flow battery or hybrid flow battery may be any of the compounds as described above. In such flow batteries, the compound is soluble in the electrolyte that supports the flow battery, or the compound may be insoluble in which case, the battery is a hybrid flow battery (i.e. solids are present in the electrolyte in either the charged or discharged state). In some embodiments, for the flow batteries, R$^1$ and R$^2$ are C(O)OH or C(O)OR$^3$ and R$^3$ is a C$_1$-C$_6$ alkyl. In other embodiments of the compounds for flow batteries, R$^4$, R$^5$, R$^6$, R$^{11}$, R$^{12}$, R$^{13}$ R$^{15}$, R$^{16}$, R$^{17}$, and R$^{18}$ are H or C$_1$-C$_6$ alkyl.

The electrode solute or electrode suspended in solution may include any of the above compounds alone or in combinations of any two or more such compounds. In some embodiments, the compound is terephthalic acid, mono-methyl terephthalic acid, dimethyl terephthalic acid, monoethyl terephthalic acid, diethyl terephthalic acid, monoisopropyl terephthalic acid, diisopropyl terephthalic acid, methyl isopropyl terephthalic acid, ethyl isopropyl terephthalic acid, ethylmethylterephthalic acid, polyethylene terephthalate,

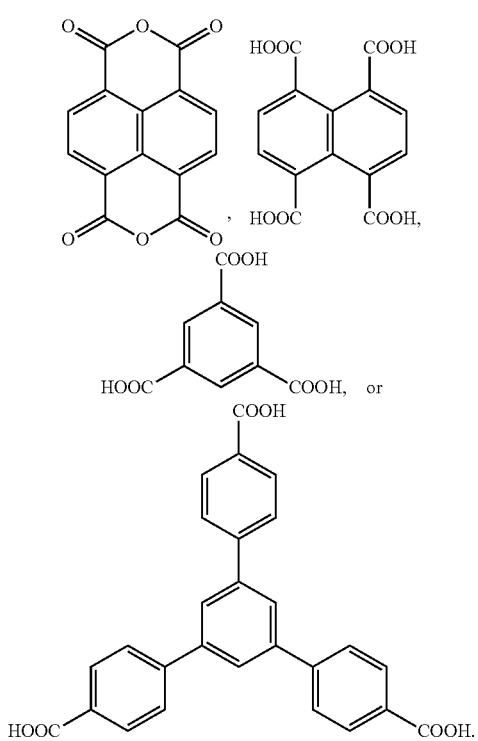

In other embodiments, the compound is mono-methyl terephthalic acid, dimethyl terephthalic acid, monoethyl terephthalic acid, diethyl terephthalic acid, monoisopropyl terephthalic acid, diisopropyl terephthalic acid, methyl isopropyl terephthalic acid, ethyl isopropyl terephthalic acid, or ethylmethylterephthalic acid. In one embodiment, the compound is terephthalic acid.

As will be further illustrated by the examples below, the compounds of generic formula $R^1$—Y—$R^2$ provide for surprising advantages over other materials. For example, the compound provide for voltage profiles that do not vary over many charge/discharge cycles, thus the compounds exhibit excellent reversibility with regard to electrochemical redox reactions. The compounds are able to deliver discharge capacities of from about 240 mAh/g to about 260 mAh/g. In flow batteries, the solubility of the compound in carbonate solvent does not decrease the ionic conductivity of the electrolyte. This allows for the uses of this compound in flow batteries because it can insert cations such as Li or Na.

As noted above, the electrolytes with the electrode solute or electrode suspended in solution may include a solvent and the compound. Suitable solvents include, but are not limited to carbonates, sulfones, formamides, lactones, nitriles, ionic liquids, and ethers. Illustrative solvents include, but are not limited to ethylene carbonate, propylene carbonate, dimethylformamide, dimethylacetamide, gamma-butyrolactone, gamma-valerolactone, delta-valerolactone, pyrrolidinone, 1-methyl-2-pyrrolidinone, ethyl heptanoate, acetonitrile, 1,3-dioxolane, 2-methyluran, 1,3-dimethoxypropane, glycerol carbonate methyl carbonate, dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, dimethoxyethane, triglyme, dimethylvinylene carbonate, tetraethyleneglycol, dimethyl ether, polyethylene glycols, and sulfones.

In such batteries or electrolytes the compound may be added as an additive to the electrolyte for overdischarge or cell balancing. The concentration of the additive can range from about 0.01 wt % to about 20 wt % based upon the weights of the compound and electrolyte. In some embodiments, the amount of compound is from about 0.1 wt % to about 5 wt %. In some embodiments, the amount of compound is from about 0.1 wt % to about 1 wt %.

The electrolyte may also include a salt to enhance the conductivity of the electrolyte. Suitable salts include those such as, but not limited to, Illustrative salts are LiBr, NaBr, LiI, NaI, LiSCN, NaSCN, $LiBF_4$, $NaBF_4$, $LiAlF_4$, $NaAlF_4$, $LiPF_6$, $NaPF_6$, $LiAsF_6$, $NaAsF_6$, $LiClO_4$, $NaClO_4$, $Li_2SO_4$, $Na_2SO_4$, $LiB(Ph)_4$, $NaB(Ph)_4$, $LiAlO_2$, $Li[N(FSO_2)_2]$, $Na[N(FSO_2)_2]$, $Li[SO_3CH_3]$, $Na[SO_3CH_3]$, $Li[BF_3(C_2F_5)]$, $Na[BF_3(C_2F_5)]$, $Li[PF_3(CF_2CF_3)_3]$, $Na[PF_3(CF_2CF_3)_3]$, $Li[B(C_2O_4)_2]$, $Na[B(C_2O_4)_2]$, $Li(BC_2O_4F_2)$, $Na(BC_2O_4F_2)$, $Li[PF_4(C_2O_4)]$, $Na[PF_4(C_2O_4)]$, $Li[N(CF_3SO_2)_2]$, $Na[N(CF_3SO_2)_2]$, $Li[C(SO_2CF_3)_3]$, $Na[C(SO_2CF_3)_3]$, $Li[N(C_2F_5SO_2)_2]$, $Na[N(C_2F_5SO_2)_2]$, $LiCF_3SO_3$, $NaCF_3SO_3$, $Li_2B_{12}X_{12-n}H_n$, $Na_2B_{12}X_{12-n}H_n$, $Li_2B_{10}X_{10-n}H_{n'}$, $Na_2B_{10}X_{10-n}H_{n'}$, $Li_2S_{x''}$, $Na_2S_{x''}$, $(LiS_{x''}R)_y$, $(NaS_{x''}R)_y$, or $(LiSe_{x''}R)_y$; $(NaSe_{x''}R)_y$, where X is a halogen, n is an integer from 0 to 12, n' is an integer from 0 to 10, x'' is an integer from 1 to 20, y is an integer from 1 to 3, and R is H, alkyl, alkenyl, aryl, ether, F, $CF_3$, $COCF_3$, $SO_2CF_3$, or $SO_2F$.

In one embodiment, the compound is soluble in a carbonate, a sulfone, or an ether solvent, and the electrolyte is to be used as additive in a lithium or a sodium battery. In such an embodiment, the compound may be any of those above, including, but not limited to, terephthalic acid, dimethyl terephthalic acid, monomethyl terephthalic acid, methyl ethyl terephthalic acid, diethyl terephthalic acid, monoethyl terephthalic acid, monoisopropyl terephthalic acid, diisopropyl terephthalic acid, methyl isopropyl terephthalic acid, ethyl isopropyl terephthalic acid, or polyethylene terephthalate.

The present invention, thus generally described, will be understood more readily by reference to the following examples, which are provided by way of illustration and are not intended to be limiting of the present invention.

EXAMPLES

Example 1

Figure 2:
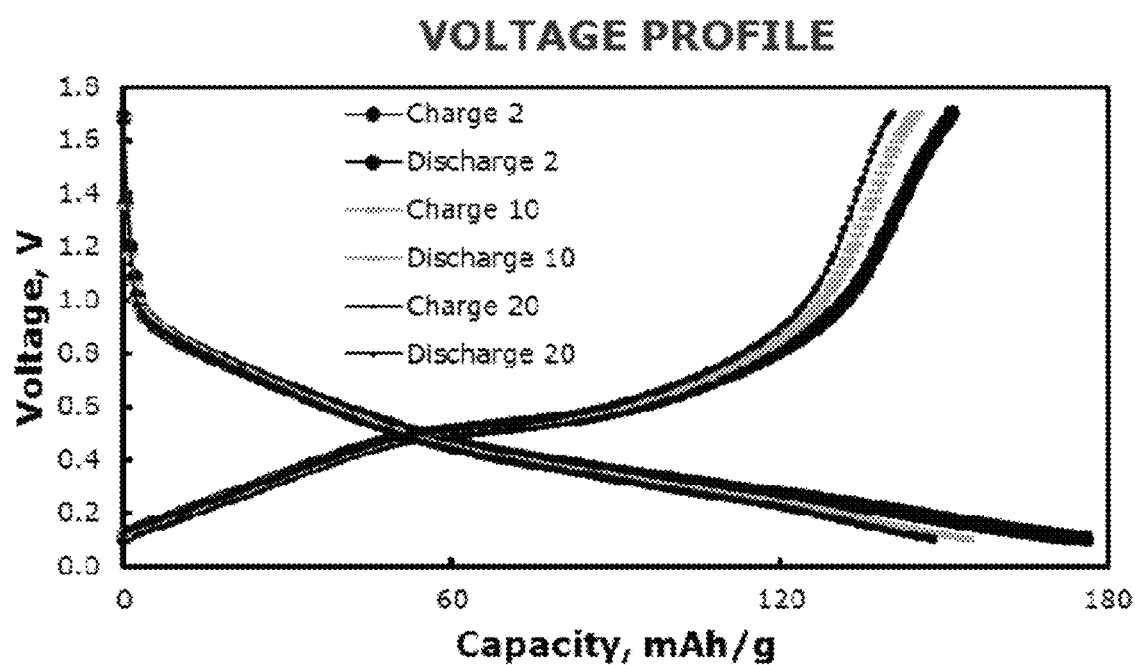
FIG. 2 is a graph illustrating the voltage profile versus the capacity of Na/$H_2$BDC half-cell, according to the examples.

An anode laminate was prepared by mixing 50 wt % of terephthalic acid ($H_2BDC$; available from Aldrich) abbreviated thereafter as, 35 wt % of super P carbon and 15 wt % of sodium alginate binder (suspension in water). The electrode was obtained by spreading the suspension on copper foil and evaporating the water at 70° C. in an oven overnight. The electrode-containing $H_2BDC$ was tested in a half-cell using 2325 coin cell batteries, using sodium metal and an electrolyte of 1M $NaPF_6$ in a solvent mixture of ethylene carbonate and ethylmethyl carbonate in a volume ratio of 3:7 (3EC/7EMC). The $H_2BDC$ delivered an initial capacity of 153 mAh·$g^{-1}$ at a 20 mA/g current rate, and more than 141 mAh·$g^{-1}$ (92% of the initial capacity) was sustained for more than 20 cycles (FIG. 1). The voltage profile of the Na/$H_2BDC$ cell was identical for the following cycles (FIG. 2) which indicates that the system exhibits good reversibility.

Example 2

Figure 3:
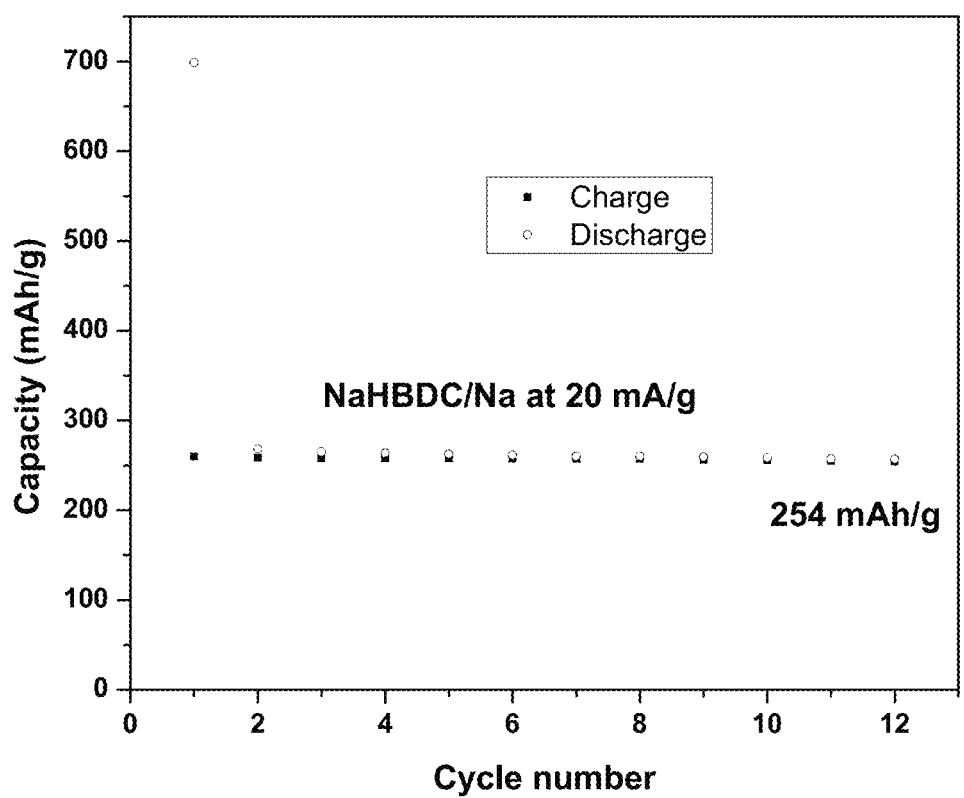
FIG. 3 is a graph illustrating the capacity versus the cycle of Na/NaHBDC half-cell, according to the examples.
Figure 4:
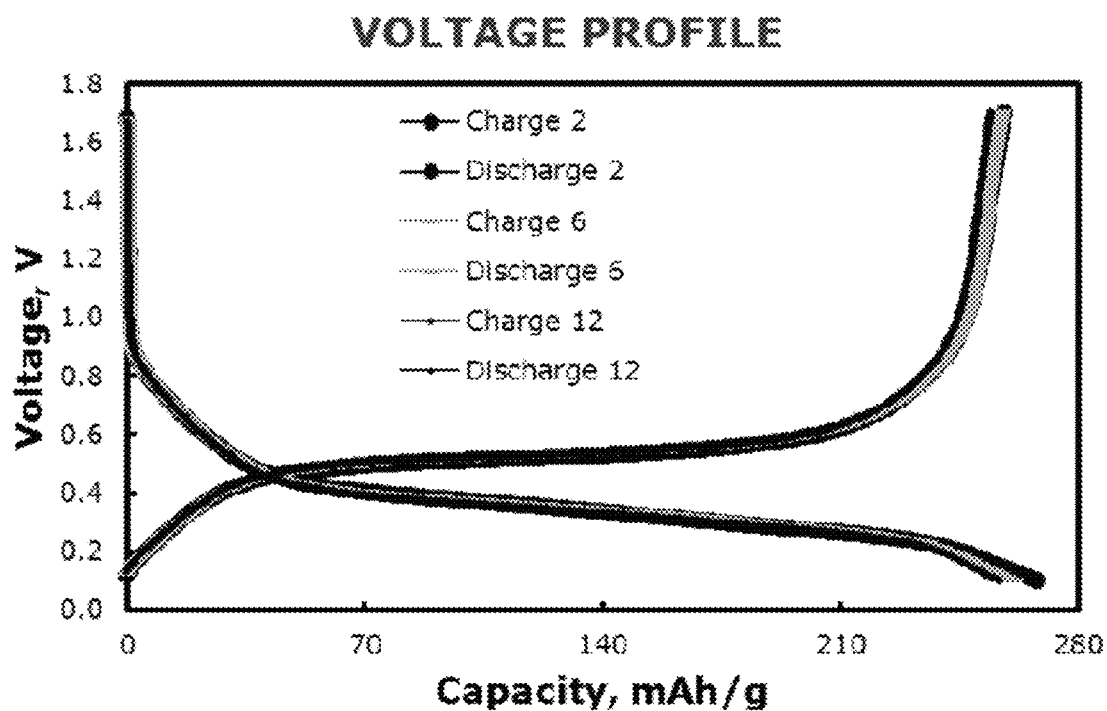
FIG. 4 is a graph illustrating the voltage profile versus the capacity of Na/NaHBDC half-cell, according to the examples.

Monosodium terephthalic acid (NaHBDC) was prepared from the one pot reaction of stoichiometric amounts of terephthalate acid and sodium carbonate in water. An anode laminate was prepared by mixing 50 wt % NaHBDC, 35 wt % of super P carbon, and 15 wt % sodium alginate binder (suspension in water). The electrode was obtained by spreading the suspension on copper foil and evaporating the water at 70° C. in an oven overnight. The electrode containing the NaHBDC was tested in a half-cell using 2325 coin cell batteries, using sodium metal and an electrolyte of 1M $NaPF_6$ in 3EC/7EMC. The NaHBDC delivered an initial capacity of 260 mAh/g under 20 mA/g current rate, and more than 254 $mAh \cdot g^{-1}$ (98% of the initial capacity) was sustained for more than 12 cycles (FIG. 3). The voltage profile of the Na/NaHBDC cell was identical for the following cycles (FIG. 4), which indicates the good reversibility of the system.

Example 3

Figure 5:
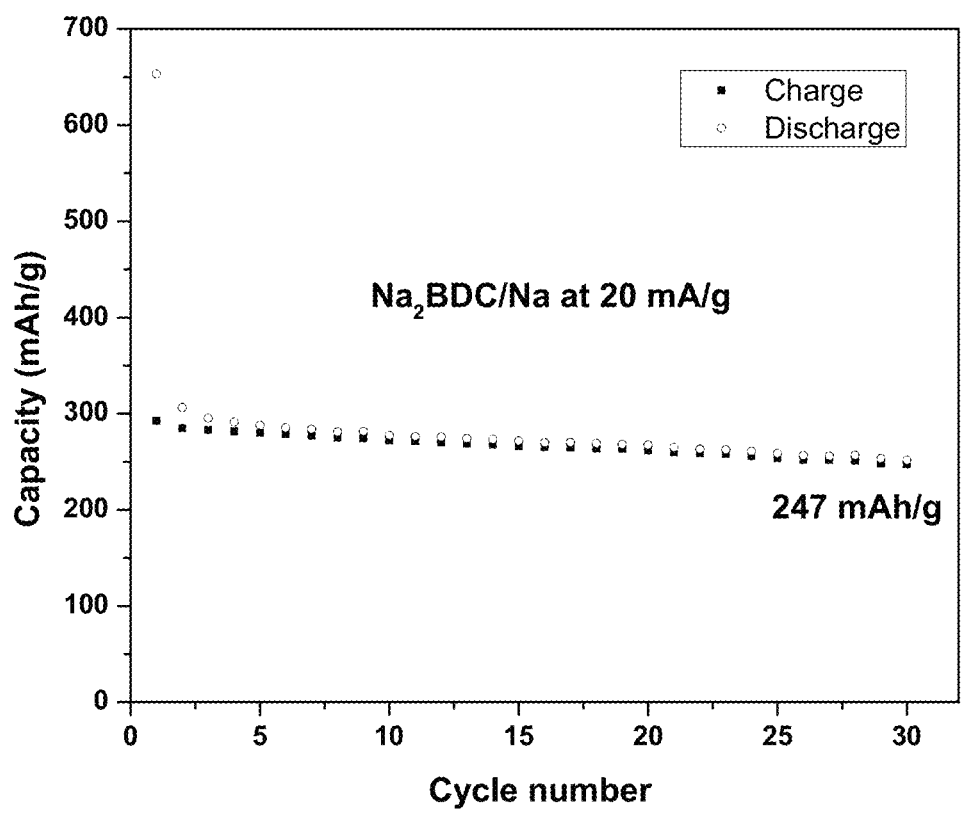
FIG. 5 is a graph illustrating the capacity versus the cycle of Na/$Na_2$BDC half-cell, according to the examples.
Figure 6:
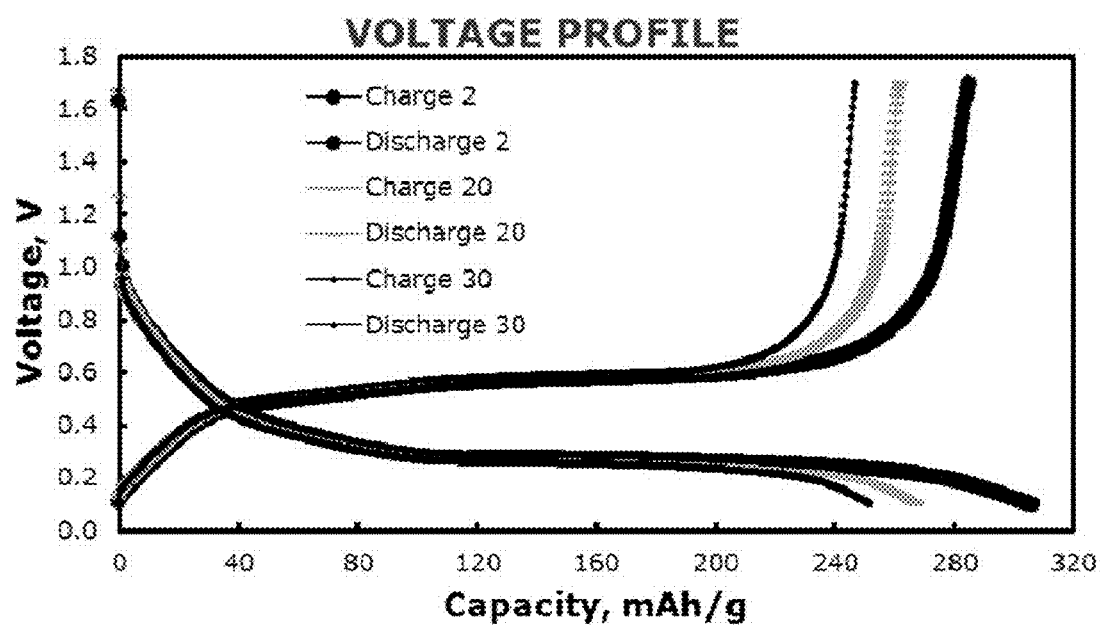
FIG. 6 is a graph illustrating the voltage profile versus the capacity of Na/$N_2$BDC half-cell, according to the examples.

Disodium terephthalic acid ($Na_2BDC$) was prepared from the one pot reaction of stoichiometric amounts of terephthalate acid and sodium carbonate in water. An anode laminate was prepared by mixing 50 wt % of $Na_2BDC$, 35 wt % of super P carbon, and 15 wt % of a sodium alginate binder (suspension in water). The electrode was obtained by spreading the suspension on copper foil and evaporating the water at 70° C. in an oven overnight. The electrode containing the $Na_2BDC$ was tested in a half-cell using 2325 coin cell batteries, using sodium metal and an electrolyte of 1M $NaPF_6$ in 3EC/7EMC. The $Na_2BDC$ delivered an initial capacity of 292 $mAh \cdot g^{-1}$ $mAh \cdot g^{-1}$ under 20 mA/g current rate, and more than 247 mAh/g (85% of the initial capacity) was sustained for more than 30 cycles (FIG. 5). The voltage profile of the Na/$Na_2BDC$ cell was identical for the following cycles (FIG. 6), which indicates good reversibility of the system.

Example 4

Figure 7:
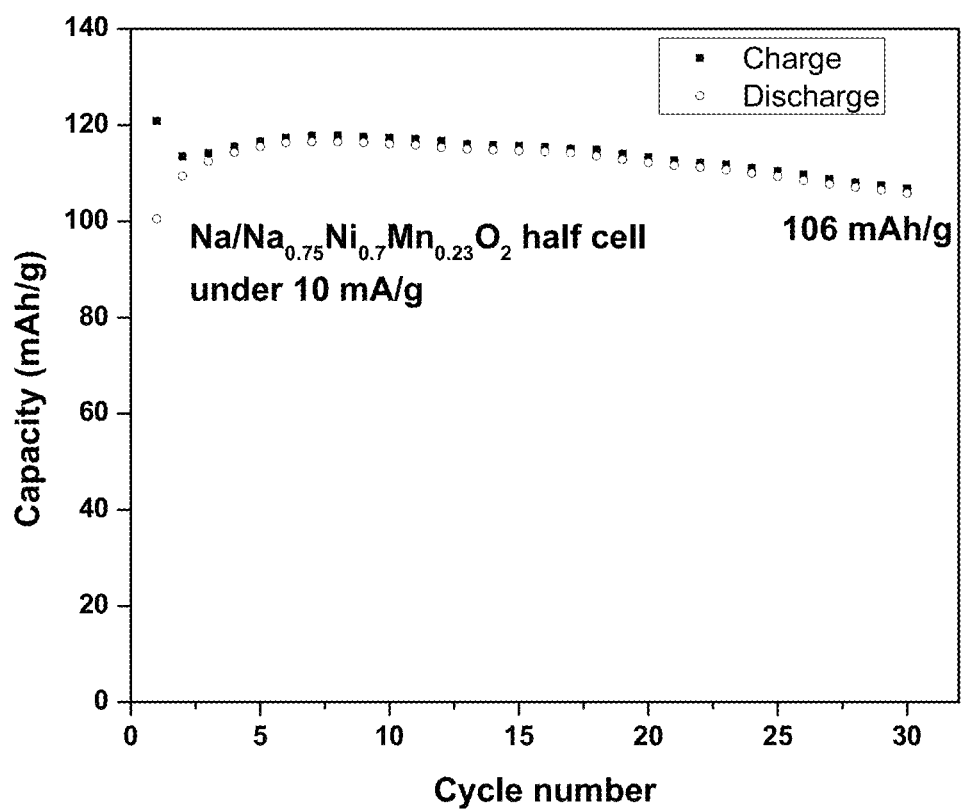
FIG. 7 is a graph illustrating the capacity versus the cycle of Na/$Na_{0.75}Mn_{0.7}Ni_{0.23}O_2$ half-cell, according to the examples.
Figure 8:
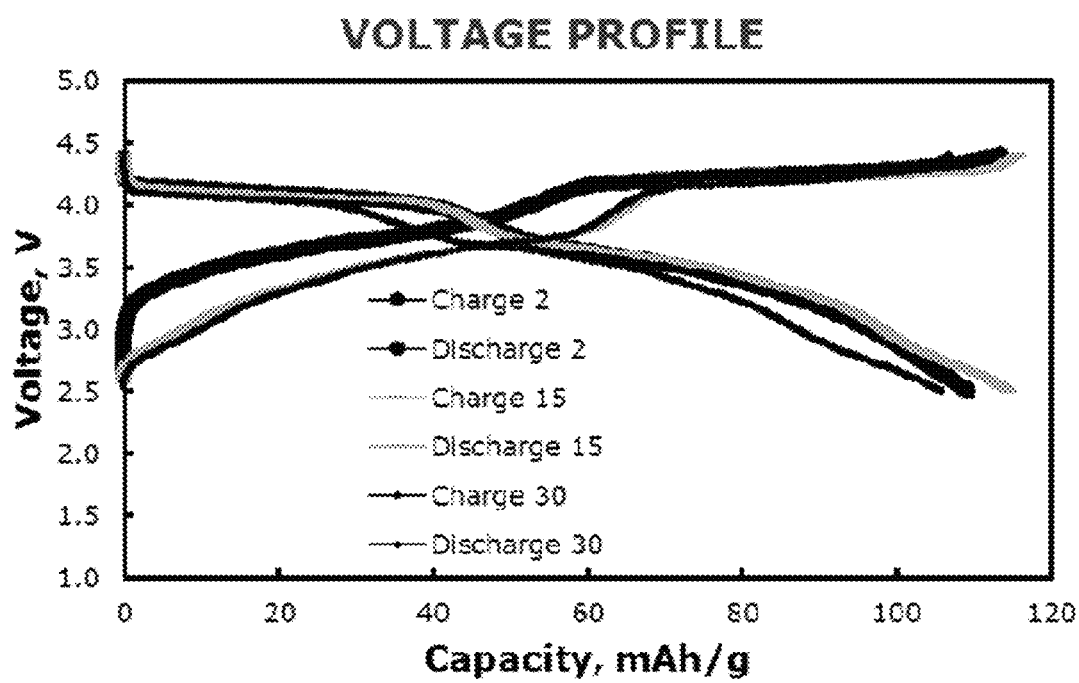
FIG. 8 is a graph illustrating the voltage profile versus the capacity of Na/$Na_{0.75}Mn_{0.7}Ni_{0.23}O_2$ half-cell, according to the examples.
Figure 9:
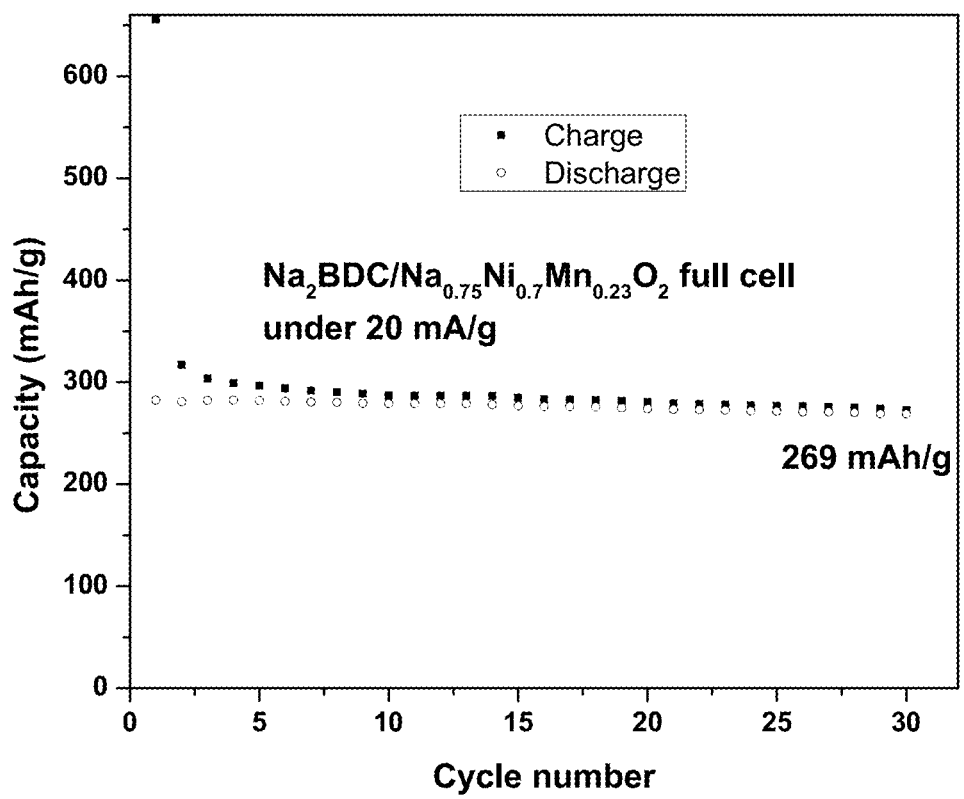
FIG. 9 is a graph illustrating the capacity versus the cycle of $N_2$BDC/$Na_{0.75}Mn_{0.7}Ni_{0.23}O_2$ full cell, according to the examples.
Figure 10:
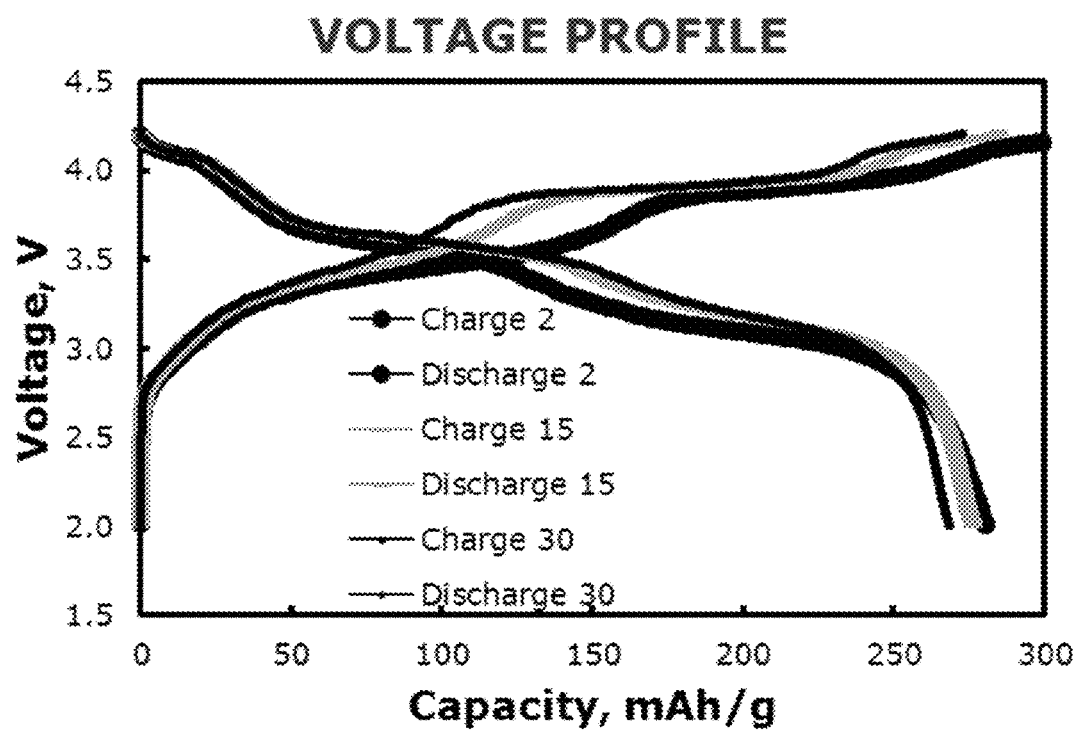
FIG. 10 is a graph illustrating the voltage profile versus the capacity of $N_2$BDC/$Na_{0.75}Mn_{0.7}Ni_{0.23}O_2$ full cell, according to the examples.

$Na_2BDC$ anode laminate from Example 3 was tested in a full cell configuration using $Na_{0.75}Mn_{0.7}Ni_{0.23}O_2$ oxide as a cathode material. $Na_{0.75}Mn_{0.7}Ni_{0.23}O_2$ oxide was prepared by heating the mixture of $Na_2CO_3$ and $Mn_{0.75}Ni_{0.25}CO_3$ precursors at 900° C. in air for 16 hours. Before assembling the $Na_{0.75}Mn_{0.7}Ni_{0.23}O_2$/$Na_2BDC$ full cell, the cathode material was examined in a half-cell configuration using sodium metal and an electrolyte of 1M $NaPF_6$ in 3EC/7EMC. The $Na_{0.75}Mn_{0.7}Ni_{0.23}O_2$ material was found to deliver a discharge capacity of about 101 $mAh \cdot g^{-1}$ after the first cycle under the current rate of 10 mA/g, where a 3.7V battery is achieved (FIG. 7). Some fade is observed with cycling, but more than 106 $mAh \cdot g^{-1}$ capacity was sustained after 30 cycles (FIG. 8). When the cathode was assembled with the $Na_2BDC$ anode material, a 3.5V battery was obtained with an initial capacity of 282 $mAh \cdot g^{-1}$ (based on the anode weight) centered at 3.5V. The $Na_{0.75}Mn_{0.7}Ni_{0.23}O_2$/$Na_2BDC$ full cell was cycled under 20 $mAh \cdot g^{-1}$ (about C/15) between 2 and 4.2V (FIG. 9). A small amount of capacity decay was observed upon cycling (less than 5% in 30 cycles) and more than 269 $mAh \cdot g^{-1}$ discharge capacity was sustained after 30 cycles (FIG. 10). The full cell electrochemical performance is better than the half-cell performance due to the Na metal reacting with the electrolyte.

Example 5

Figure 11:
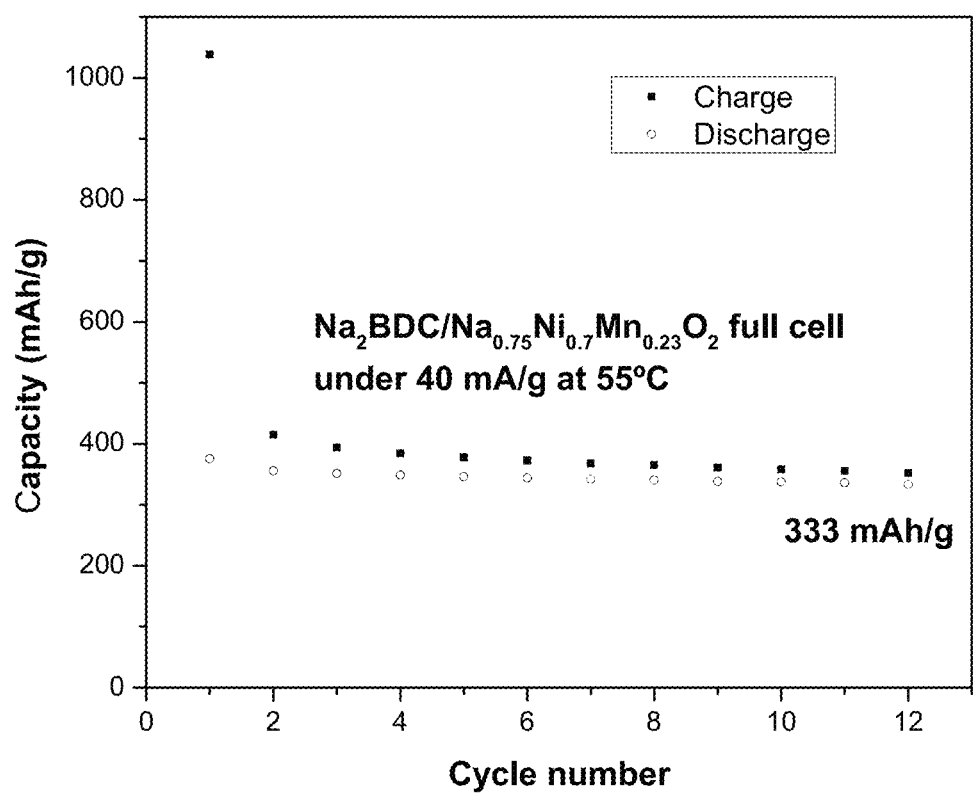
FIG. 11 is a graph illustrating the capacity versus the cycle of $N_2$BDC/$Na_{0.75}Mn_{0.7}Ni_{0.23}O_2$ full cell under 55° C., according to the examples.

The $Na_2BDC$/$Na_{0.75}Mn_{0.7}Ni_{0.23}O_2$ full cell was tested at an elevated temperature of 55° C. with the current rate of 40 $mAh \cdot g^{-1}$. A small capacity fade was observed with cycling (less than 11% in 12 cycles) and more than 333 $mAh \cdot g^{-1}$ discharge capacity was sustained after 12 cycles based on the weight of the anode (FIG. 11).

Example 6

Figure 12:
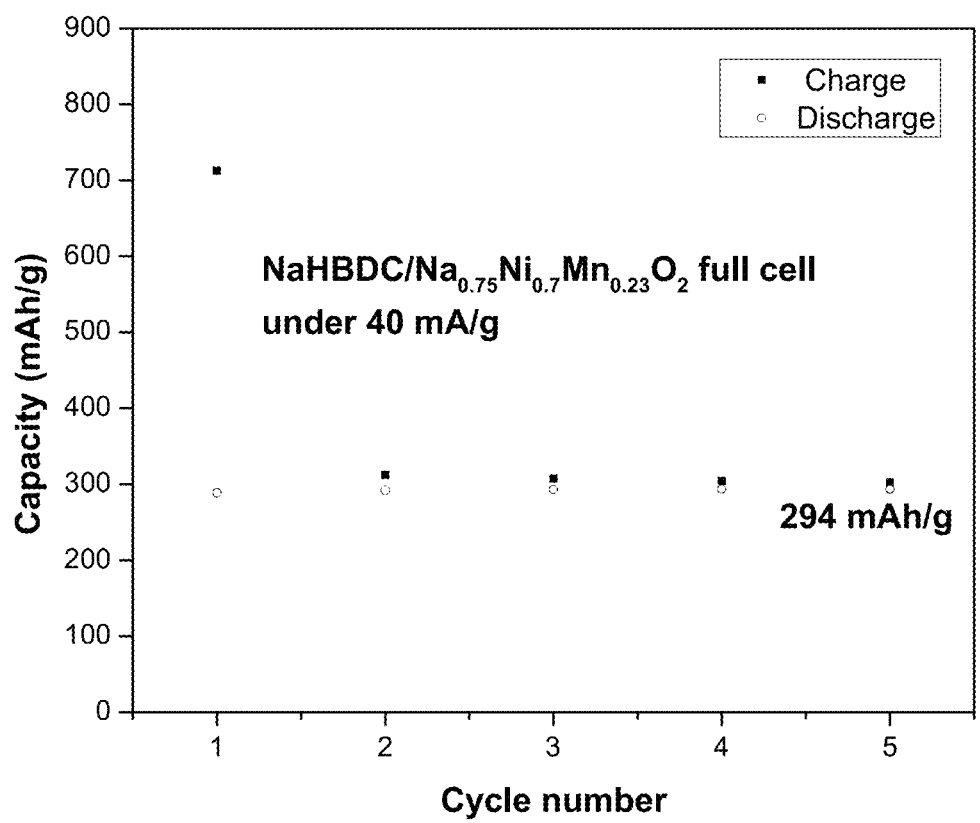
FIG. 12 is a s graph illustrating the capacity versus the cycle of NaHBDC/$Na_{0.75}Mn_{0.7}Ni_{0.23}O_2$ full cell, according to the examples.

A NaHBDC/$Na_{0.75}Mn_{0.7}Ni_{0.23}O_2$ full cell was made and cycled between 2V and 4.2V under the current rate of 40 mA/g. No fade was observed with cycling and more than 294 $mAh \cdot g^{-1}$ discharge capacity was sustained after 5 cycles based on the weight of the anode (FIG. 12).

Example 7

Flow Battery. Diethyl terephthalatic acid (DET) was dissolved in an electrolyte containing $LiPF_6$ or $NaPF_6$ at different concentrations in 3EC/7EMC at various concentrations, with the ionic conductivity (IC) being measured for each concentration. The DET is one of the electroactive materials. The ionic conductivity of the electrolyte alone was also measured. The following table provides the results.

| Conc. DET (M) | Conc. $LiPF_6$ (M) | Conc. $NaPF_6$ (M) | IC (mS/cm) |
|---|---|---|---|
| — | 1.2 | — | 8.8 |
| 0.4 | 1.2 | — | 7.6 |
| — | — | 1.0 | 22 |
| 0.4 | — | 1.0 | 20 |

Higher ionic conductivity is necessary for good performance of the battery. The above table clearly shows that the addition of high concentration of additives (DET) has minimal impact on the conductivity, but a significant impact on the capacity as shown above.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A flow battery comprising an active material comprising a compound represented by any one or more of Formulas IA, IB, and ID:

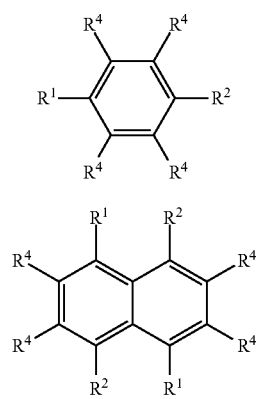

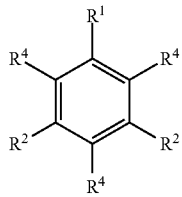

wherein $R^1$ and $R^2$ are individually C(O)OM, or C(O)OR$^3$; each $R^3$ is individually H or $C_1$-$C_6$ alkyl; each $R^4$ is H; and M is Na, K, or Mg.

2. The flow battery of claim 1, wherein each $R^3$ is H.

3. The flow battery of claim 1, wherein each $R^3$ is $C_1$-$C_6$ alkyl.

4. The flow battery of claim 1, wherein the compound is represented by one or more of:

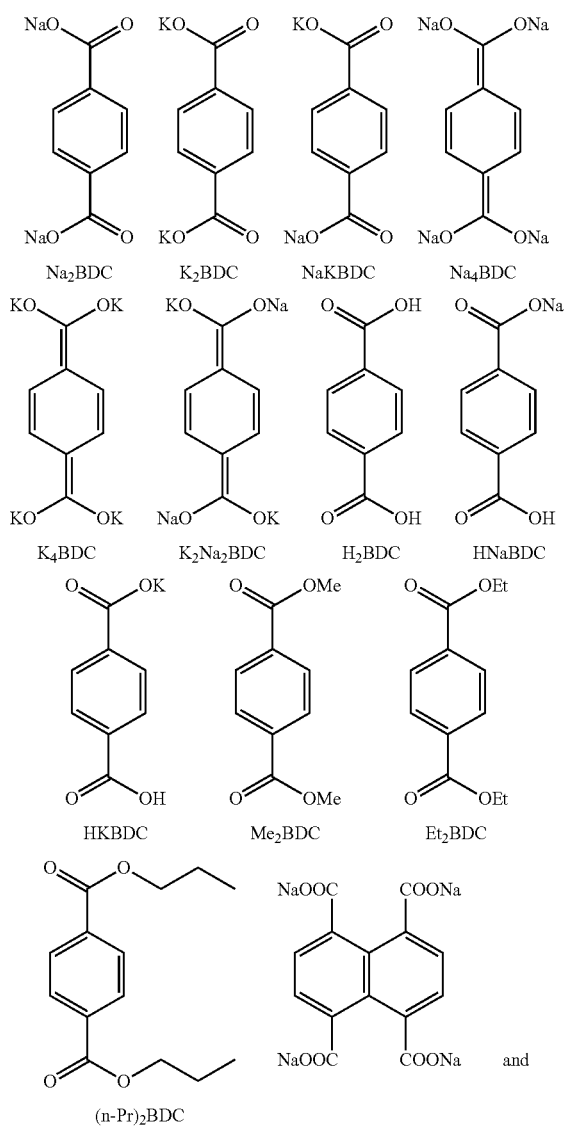

-continued

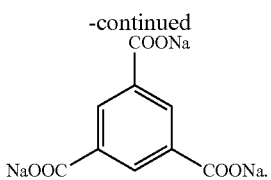

5

5. A redox flow battery comprising monosodium terephthalate (HNaBDC), monopotassium terephthalate (HKBDC), dipotassium terephthalate (K₂BDC), monosodium monolithium terephthalate (NaLiBDC), monosodium monopotassium terephthalate (NaKBDC), or monolithium monopotassium terephthalate (LiKBDC).

6. The redox flow battery of claim 5 comprising monosodium terephthalate (HNaBDC), monopotassium terephthalate (HKBDC), dipotassium terephthalate (K₂BDC), or monosodium monopotassium terephthalate (NaKBDC).

* * * * *